United States Patent [19]

Dammon

[11] Patent Number: 5,616,097
[45] Date of Patent: Apr. 1, 1997

[54] PRESS FIT CARRIER/SPINDLE FOR USE IN PLANETARY TRANSMISSION

[75] Inventor: James R. Dammon, W. Lafayette, Ind.

[73] Assignee: Fairfield Manufacturing Co., Inc., Lafayette, Ind.

[21] Appl. No.: 540,353

[22] Filed: Oct. 6, 1995

[51] Int. Cl.$^6$ .................................................. F16H 57/08
[52] U.S. Cl. ........................... 475/331; 475/346; 180/374
[58] Field of Search .................................. 475/331, 346, 475/347; 180/65.5, 65.6, 374

[56] References Cited

U.S. PATENT DOCUMENTS

| | | | |
|---|---|---|---|
| 4,186,626 | 2/1980 | Chamberlain | 475/331 X |
| 4,270,412 | 7/1981 | Beijer et al. | 475/331 |
| 4,365,525 | 12/1982 | Imazaike | 475/347 X |
| 4,583,428 | 4/1986 | Garnier | 475/331 X |
| 4,642,005 | 2/1987 | Kondo et al. | 409/232 |
| 5,024,636 | 7/1991 | Phebus et al. | 475/321 X |
| 5,156,579 | 10/1992 | Wakuta et al. | 180/65.6 X |
| 5,163,528 | 11/1992 | Kawamoto et al. | 180/65.5 |
| 5,472,059 | 12/1995 | Schlosser et al. | 475/159 X |

*Primary Examiner*—Charles A. Marmor
*Assistant Examiner*—Peter T. Kwon
*Attorney, Agent, or Firm*—Woodling, Krost & Rust

[57] ABSTRACT

A transmission comprising an input member, an output member and a planetary gear train is provided. The planetary gear train includes an output carrier and a spindle. The output carrier includes an outer conically tapered surface and the spindle includes a tapered inner surface having a variable inner diameter. The outer conically tapered surface of said output carrier includes a variable outer diameter. The output carrier is immovably affixed to said stationary spindle by forcibly press-fitting said variable outer diameter of said outer conically tapered surface of said output carrier into immoveable engagement with said variable inner diameter of said tapered inner surface of said spindle. The planetary gear train effects a speed reduction between said input member and said output member.

5 Claims, 8 Drawing Sheets

PRESS FIT CARRIER/SPINDLE FOR USE IN PLANETARY TRANSMISSION

BACKGROUND OF THE INVENTION

1. Field of the Invention

This invention relates generally to planetary reduction drives. In particular, this invention relates to an output carrier and spindle which have been joined by means of an interference fit.

Typically, the output carrier is a reaction member which is fixedly connected to a spindle. In the present invention, the output carrier is press fit into the spindle. The prior art, for instance, U.S. Pat. No. 3,686,978 to Knoblach et al., teaches and discloses a reaction member (fixed ring gear 26 as shown in FIG. 2) splined onto spindle 48 and held in place longitudinally by thrust washers 102 and 144.

It is therefore desirable to provide an output carrier which is press fit into a spindle. This assembly is extremely simple and securely affixes the output carrier to the spindle.

2. Summary of the Invention

The present invention is a planetary gear reduction drive which comprises the improvement of an output carrier which has been press fit into a spindle.

It is an object of the present invention to provide a generally conically shaped output carrier press fit into a spindle. The spindle is fixedly mounted to a vehicle. The output carrier is securely affixed to the spindle by means of a taper interference fit. The need for transmitting a given torque through the connection determines the amount of interference required and can easily be calculated by those skilled in the art.

It is a further object of the present invention to provide an output carrier having other means of friction enhancing methods at the taper interface such as serrations or a layer of anaerobic adhesive or any other means of increasing the friction between the surfaces to improve torque transmission ability.

It is a further object of the present invention to provide an output carrier which includes a tapered surface and flange portion. The spindle has a tapered inner surface which corresponds to, but which is smaller in diameter than, the tapered surface of the output carrier.

The above mentioned features and other features and objects of this invention and the manner of attaining them will become more apparent and the invention itself will be best understood by reference to the following Brief Description of the Drawings followed by the Description of the Preferred Embodiments and claims.

BRIEF DESCRIPTION OF THE DRAWINGS

FIG. 1 illustrates the spindle 1 and the output carrier 2.

FIG. 2 illustrates a tapered outer surface 30 of the output carrier. FIG. 2 also illustrates diameters $D_1$ of the exterior surface 30 of the output carrier 2. Serrations 46 are illustrated on the exterior 30 of the output carrier.

FIG. 3 further illustrates a tapered inner surface 3 having variable diameters D.

FIG. 5 illustrates a layer of anaerobic adhesive 47 on the exterior surface 30 of the output carrier.

A better understanding of the drawings will be had in connection with the Description of the Preferred Embodiment together with the claims which follow.

DESCRIPTION OF THE PREFERRED EMBODIMENT

Figure 8:
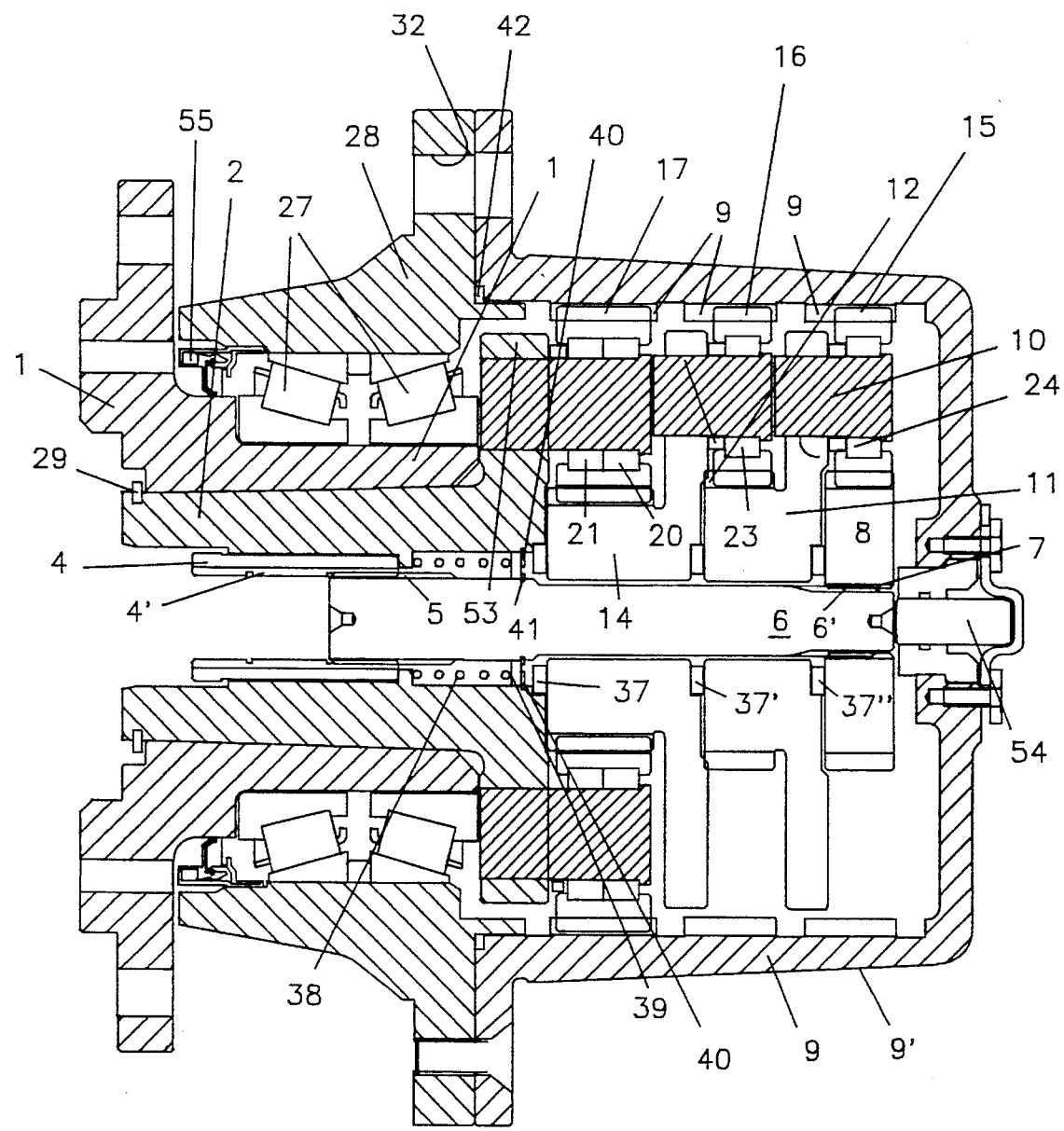
FIG. 8 illustrates the preferred embodiment of the output carrier 2 inserted into, or press fit into, the spindle 1.

FIG. 8 is a cross-sectional view of the planetary gear reduction drive. The power is input by means of a prime mover 4. Prime mover 4 is a cylindrical drive member which includes splines 4'. Shaft 6 is also shown in FIG. 8. Shaft 6 includes splines 5 which mate with splines 4' on the input member 4.

The input member 4 is not connected or affixed to the output carrier 2. Input shaft 6 further contains a spline 6' thereon for mating with a spline 7 on sun gear 8. Input shaft 6 drives sun gears 8 which in turn drives the first planet gears 15. In the preferred embodiment there are a plurality of first planet gears 15, second planet gears 16, and third planet gears 17.

Planet gears 15, 16 and 17 are supported by bearings 24, 23, 20 and 21 respectively. Pins 10, 18 and 19 in turn support the bearings and engage the first carrier 11, the second carrier 14 and the output carrier 2 respectively. First planet gears 15 react against reaction gear 9. Reaction gear 9 includes surface 9' about which a tire is mounted.

First planet carrier 11 includes gear teeth 12 located thereon. Gear 12 drives the second planet gears 16. Gears 16 react against reaction gear 9.

Second planet carrier 14 includes teeth 13 thereon. Teeth 13 drive the third planet gears 17. Third planet gears 17 react against the reaction gear 9. Reaction gear 9 includes a series of internal gears for reacting against first planet gears 15, second planet gears 16, and third planet gears 17.

Output carrier 2 as viewed in FIGS. 1, 6, 7 and 8, is fixedly secured and is immovable with respect to spindle 1. As viewed in FIGS. 7 and 8, the output carrier 2 is inserted into the spindle 1 under 50 to 300 tons force, depending on the torque requirements, applied to the flange portion of the output carrier while the spindle 1 is restrained (held stationary). The force causes the output carrier to be securely pressed into spindle 1.

Figure 4:
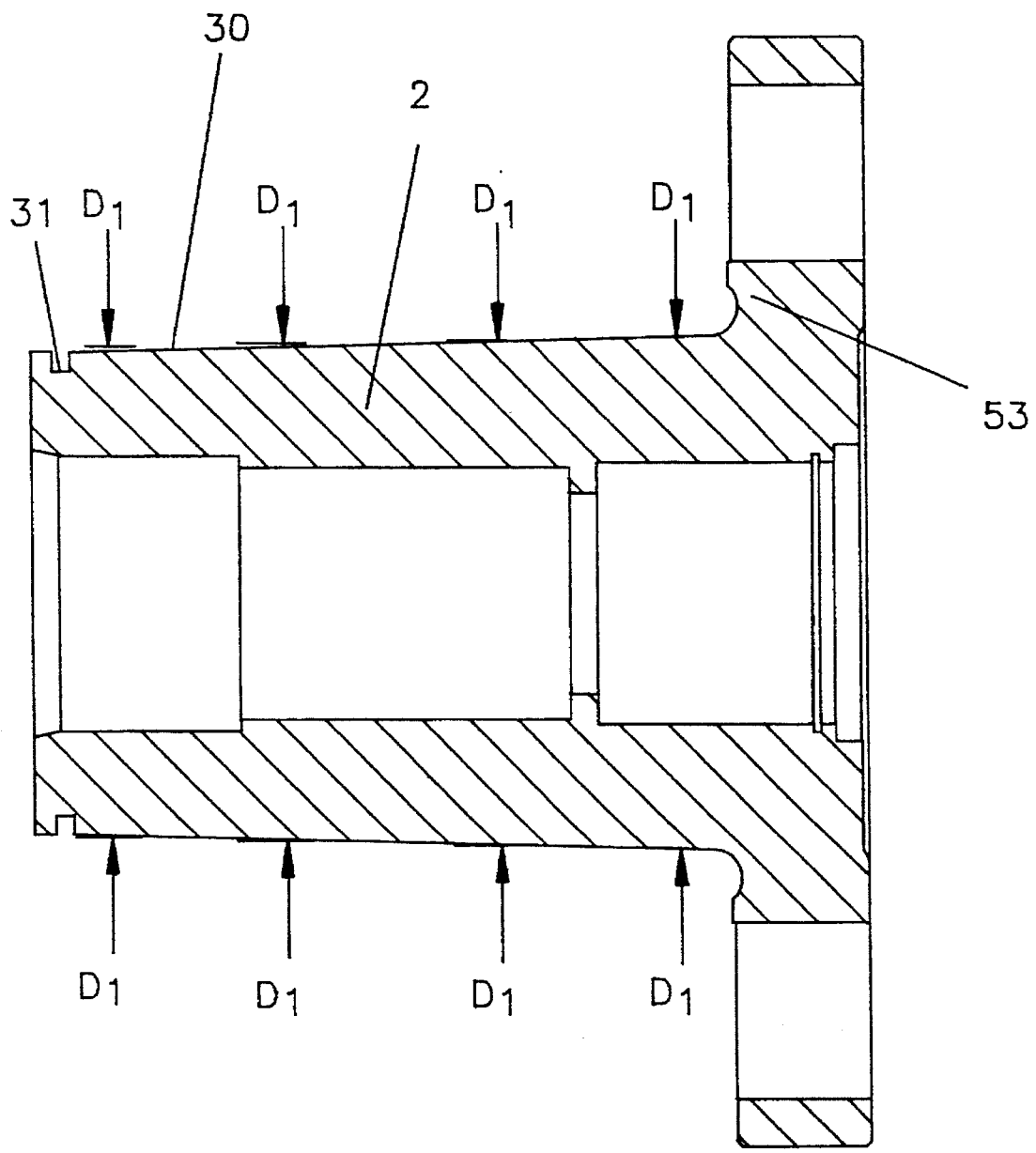
FIG. 4 illustrates the preferred embodiment of the output carrier 2.

Referring to FIG. 4, it can be seen that the output carrier 2 includes a tapered outer surface 30 which generally has a larger diameter as one refers to the rightwardly portion of the tapered slope 30. $D_1$ refers to an outer diameter that varies along the length of the tapered exterior portion 30 of output carrier 2. $D_1$ varies as the position changes along the tapered surface 30. FIG. 4 also illustrates the flanged portion 53 of the output carrier.

Figure 3:
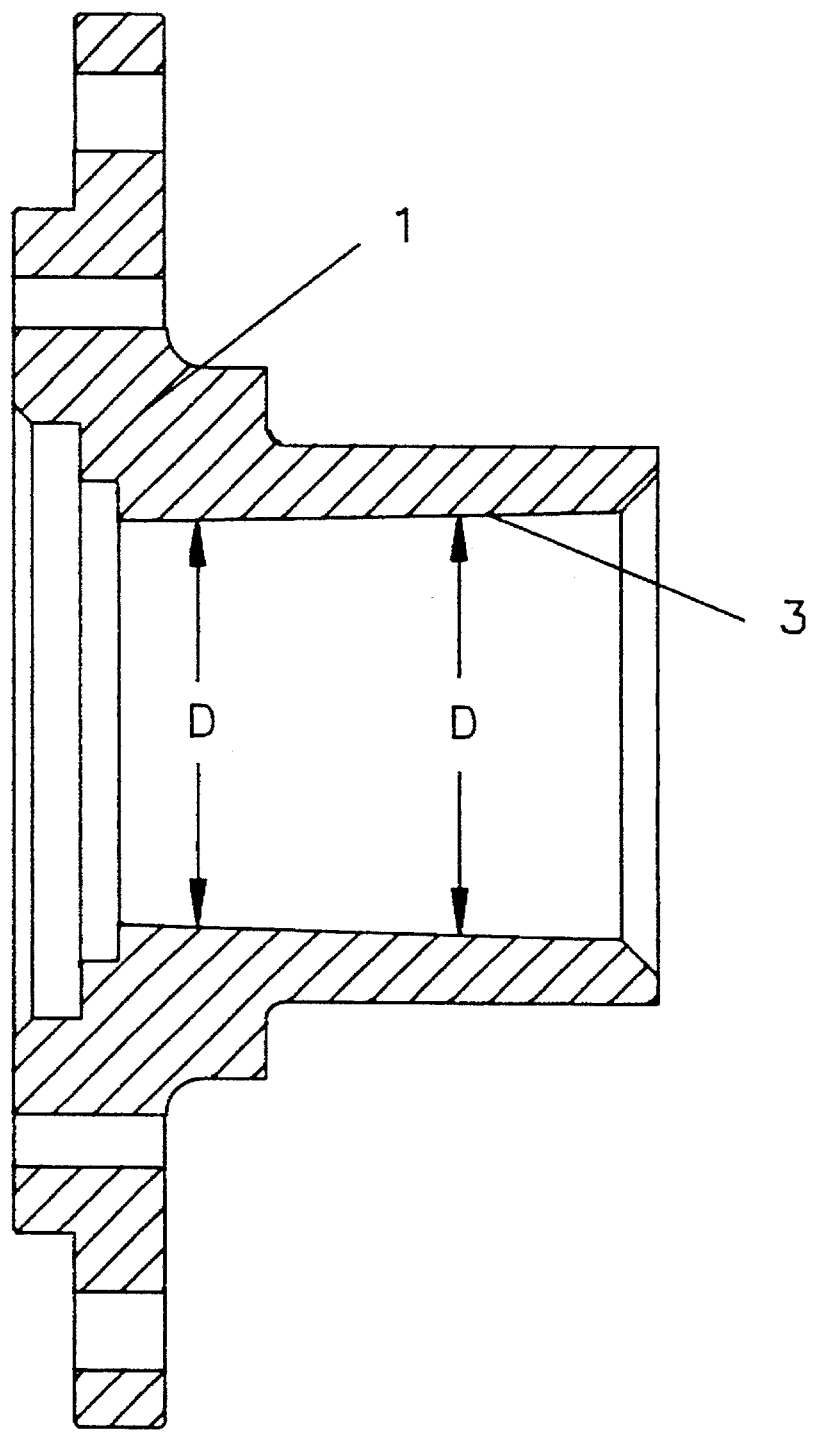
FIG. 3 is a cross-sectional view of the spindle 1.

FIG. 3 illustrates the tapered variable diameter inner surface 3 of the spindle 1. Tapered variable diameter inner surface 3 becomes smaller as one moves leftwardly when viewing FIG. 3. D as used in FIG. 3 corresponds to $D_1$ as used in FIG. 4. $D_1$ is larger than D at each and every corresponding point along the exterior surface (variable diameter outer surface) of the output carrier 2 when referenced to the corresponding point along the variable diameter tapered inner surface 3 of the spindle 1. In other words, the outer diameter $D_1$ at each and every point of the surface 30 of the output carrier is larger than the inner diameter D at each and every corresponding point of the inner surface 3 of the spindle 1 thus providing the interference fit.

Figure 1:
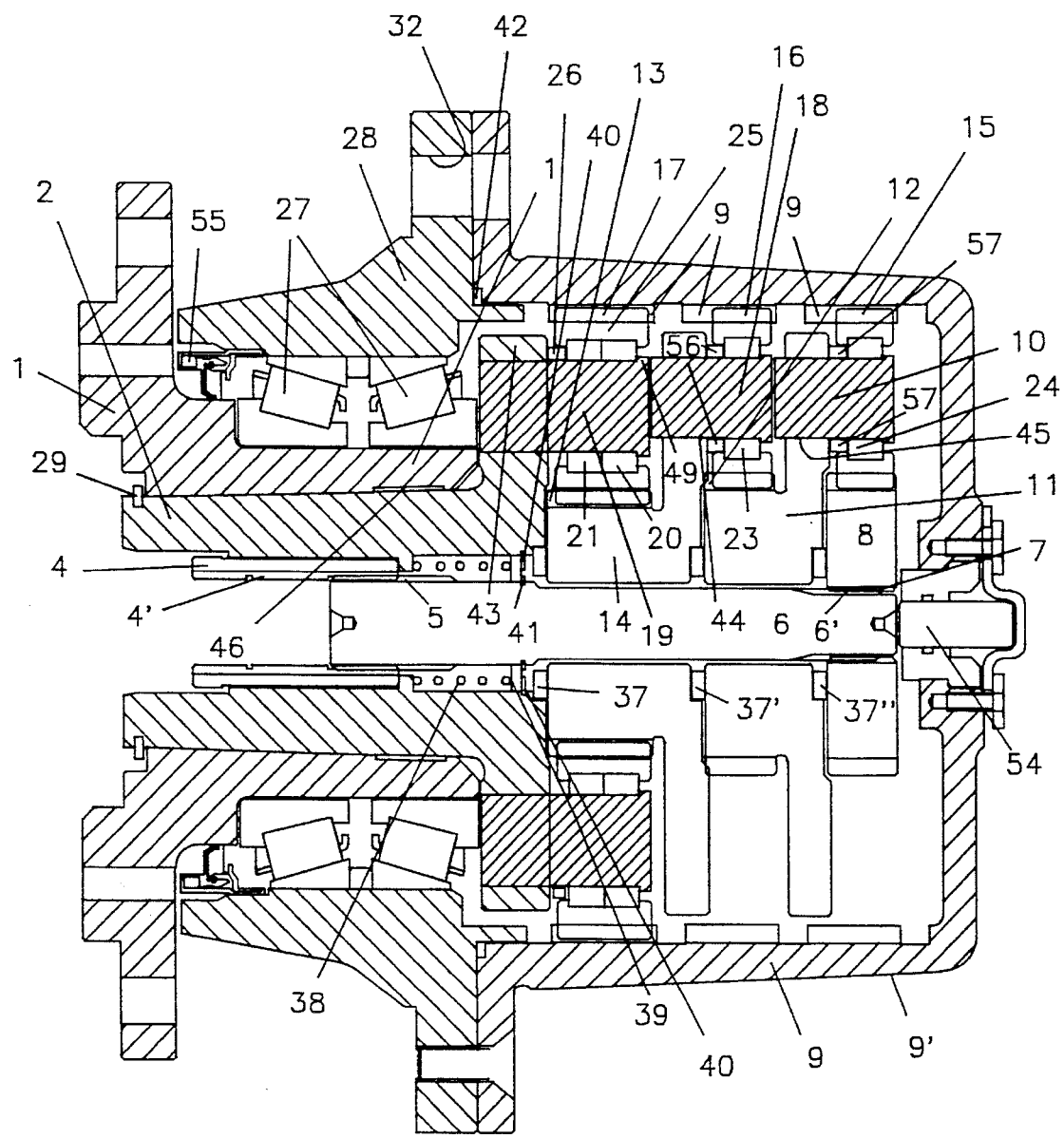
FIG. 1 is a cross-sectional view of the planetary transmission.
Figure 2:
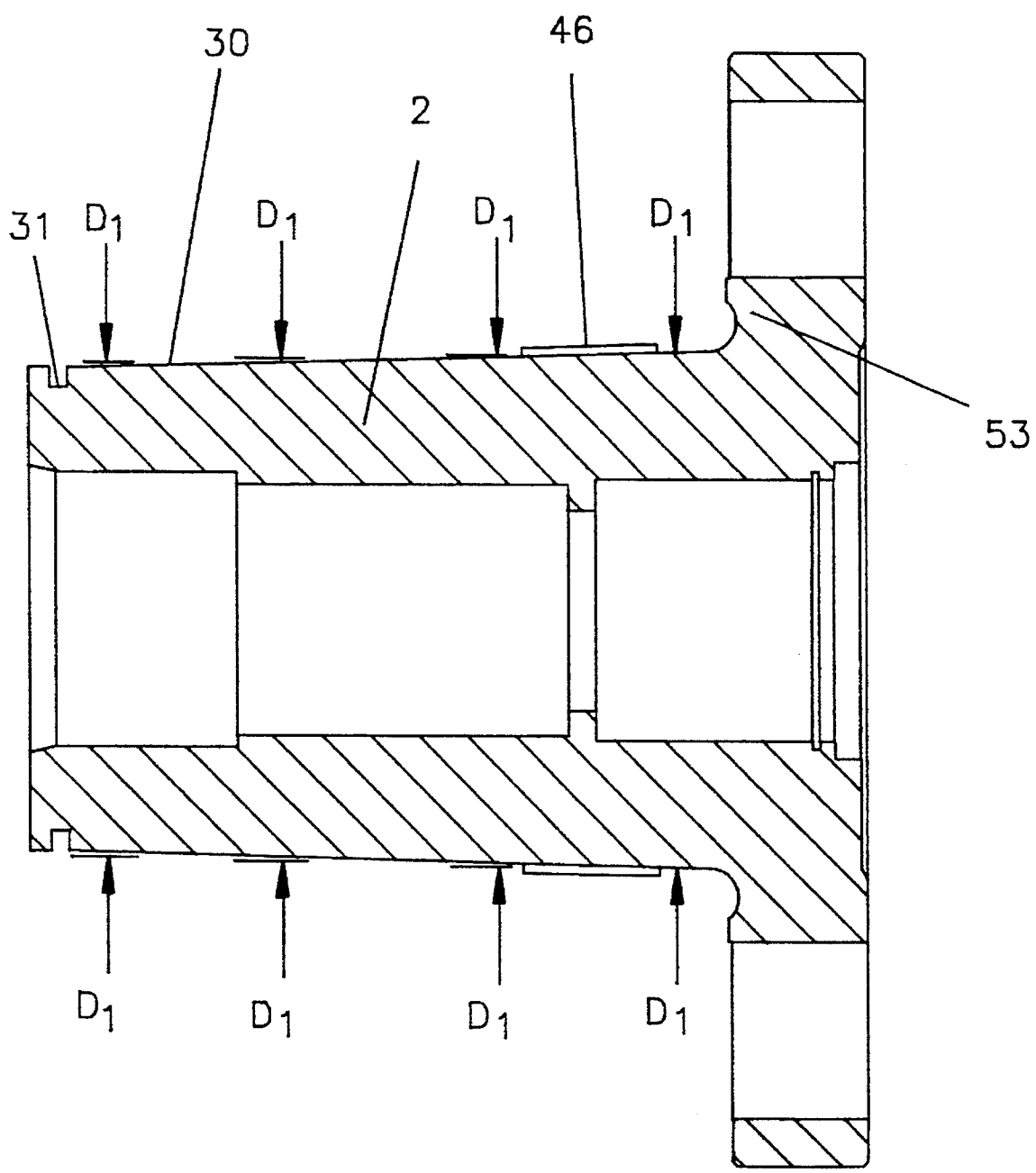
FIG. 2 is a cross-sectional view of the output carrier.

A press force is used to insert the output carrier 2 into an interference fit with the spindle 1. Varying interference fits may be used depending on the application and will be recognized by those skilled in the art upon reviewing the specification. FIG. 1 illustrates output carrier 2 having been press fit into spindle 1. In the embodiment shown in FIG. 1, output carrier 2 includes serration 46 on the exterior surface 30 thereof. Serration 46 may be employed if desirable. FIG. 2 illustrates the outer surface 30 of the output carrier 2 in detail. FIG. 2 also illustrates a slot 31 which receives snap ring 29. Snap ring 29 is used to insure that output carrier 2 never exits spindle 1. Also see FIG. 8.

Figure 5:
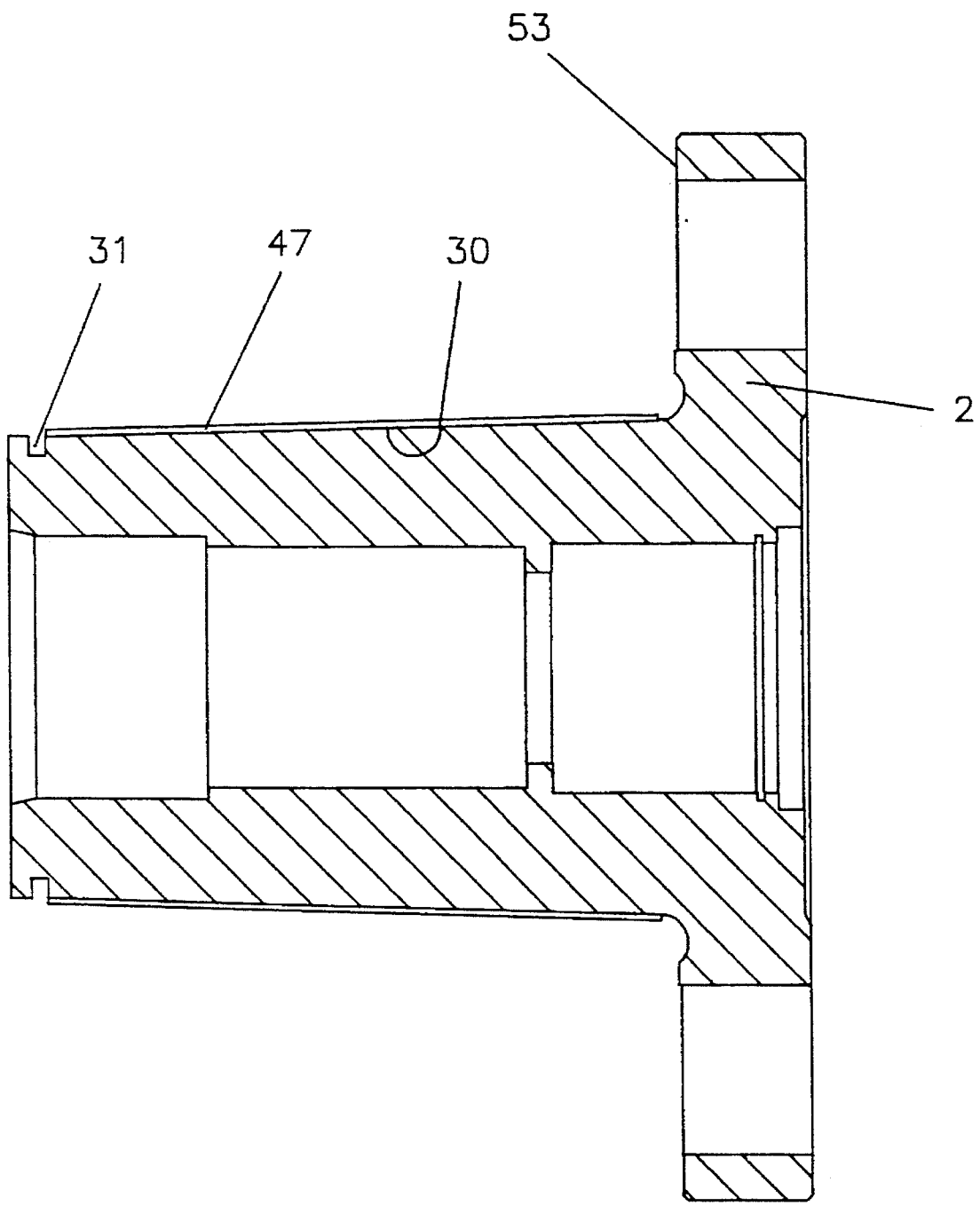
FIG. 5 is another embodiment of the output carrier 2.
Figure 6:
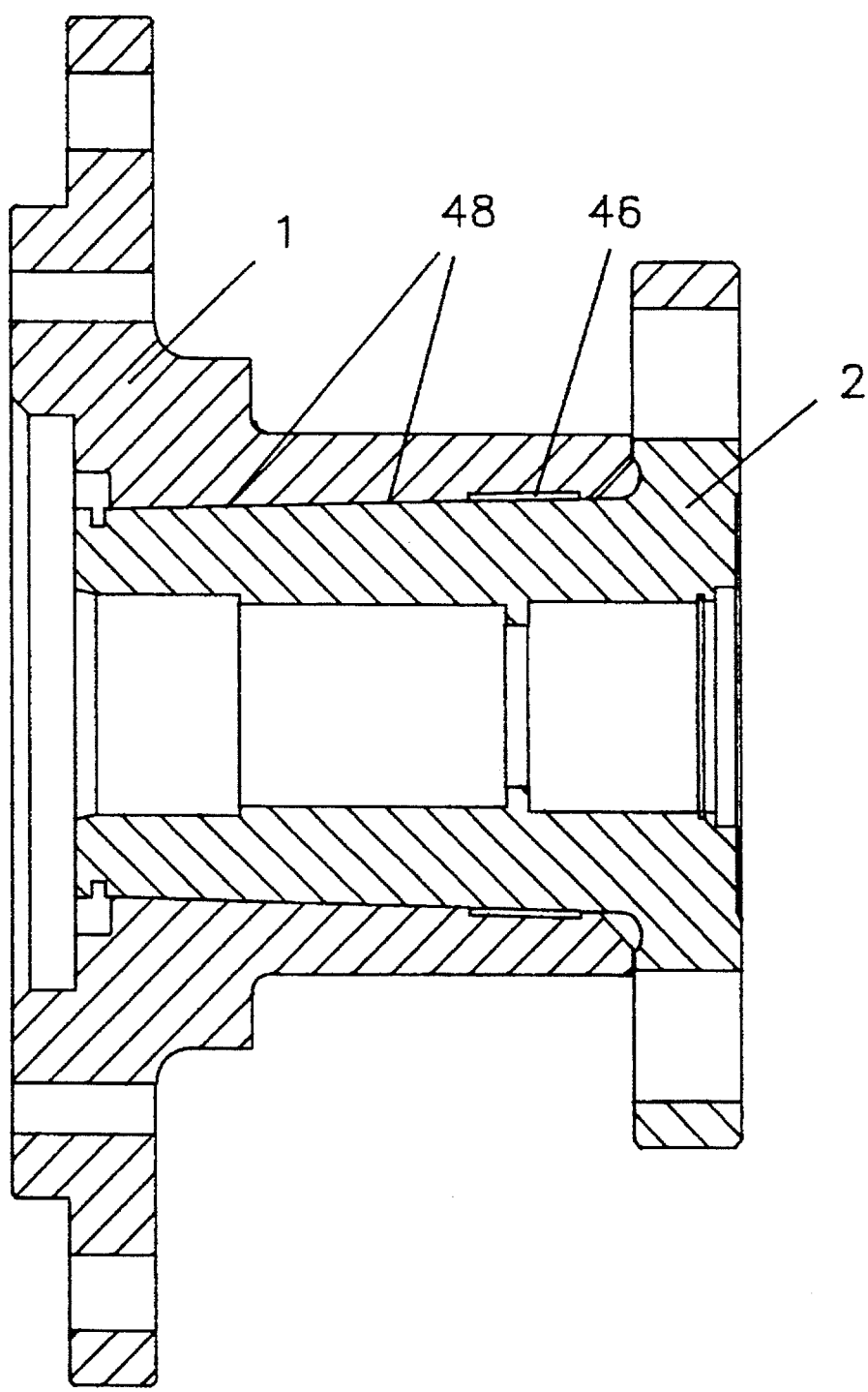
FIG. 6 is a cross-sectional view of the output carrier 2 together with serrations 46 having been press fit into the spindle 1.
Figure 7:
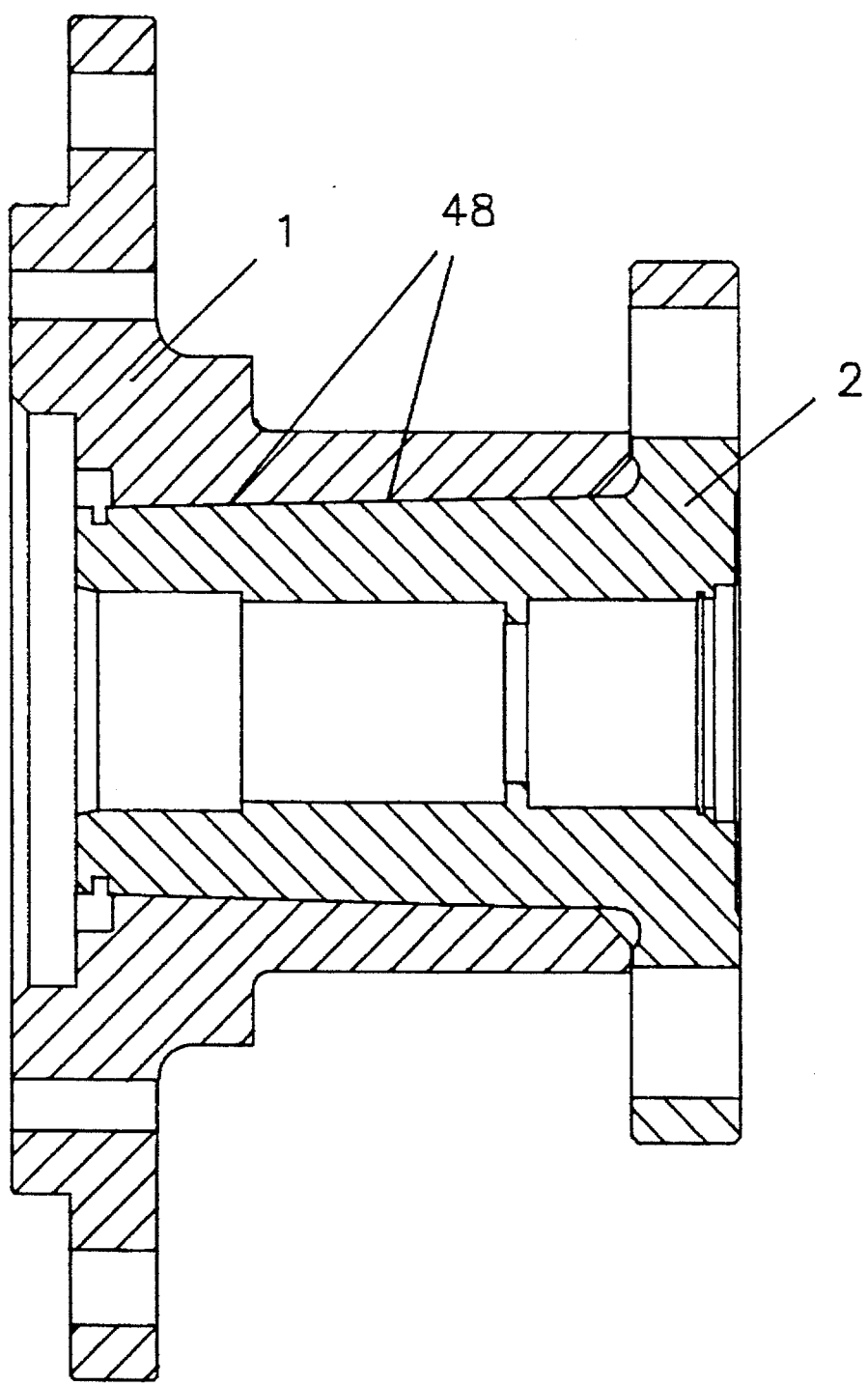
FIG. 7 is an illustration of the preferred embodiment of the output carrier which has been press fit into the spindle 1. Reference numeral 48 indicates the press fit between the output carrier 2 and the spindle 1.

Another embodiment of the output carrier includes the addition of an adhesive layer 47 as shown in FIG. 5. FIG. 5 illustrates (not to scale) an exaggerated amount of adhesive 47 applied to the output carrier. The adhesive used in the embodiment shown in FIG. 5 is a commercially available anaerobic adhesive. The anaerobic adhesive used also acts as a lubricant and enables the output carrier 2 to more easily be press fit into engagement with the spindle 1.

Shaft 6 is depth controlled with respect to planetary gear train by means of spring 38 which engages a shoulder on the output carrier 2. Spring 38 resides between the shoulder on the output carrier 2 and a collar 39 which is supported by a snap ring 41 on the shaft 6 together with a snap ring 40 in the output carrier 2. Snap ring 40 resides in a groove in the output carrier 2 and the snap ring 41 resides in a groove in the shaft 6. Shaft 6 is supported and aligned by alignment means 54 as viewed in FIGS. 1 and 8.

Spacer 37 resides between the output carrier 2 and the second planet carrier 14. Similarly, spacer 37' resides between the second output carrier 14 and the first output carrier 11. Spacer 37" resides between the first carrier 11 and the sun gear 8. Spacers 37, 37' and 37" stabilize the planetary gear reduction drive train.

Bearings 27 act between the stationery spindle 1 and the hub member 28. Bearings 27 permit the hub member 28 together with reaction member 9 to rotate independently of the spindle 1 and the output carrier 2. Hub 28 includes bolt holes 32 for affixing the hub to the reaction member 9. Seal member 42 seals the interior of the planetary transmission with respect to the exterior or outside. Lubricating and seal means 55 provide lubrication for the bearings 27.

Sun gear 8 is splined to shaft 6 such that sun gear 8 rotates with the shaft 6. For instance if shaft 6 is rotating in a clockwise direction, sun gear 8 also rotates in a clockwise direction. First planet carrier 11 rotates in a clockwise direction given an input in the clockwise direction of shaft 6. Second carrier 14 rotates in a clockwise direction given a clockwise direction of shaft 6.

Reaction member 9 rotates in a counterclockwise direction given an input in the clockwise direction of input shaft 6. The counterclockwise direction of rotation of the reaction member 9 is a result of the summation of forces applied by the first planet gears 15, the second planet gears 16, and the third planet gears 17 on the reaction gear or member 9. Reaction gear 9 comprises a series of gears as shown in FIGS. 1 and 8. Reference numeral 9' signifies an outer surface of reaction gear 9. The surface 9' is the surface upon which an outer wheel or tire resides.

The transmission illustrated in the drawing figures is typically used on independent wheel drives for farm machinery, construction machinery and mining equipment. Such machinery typically requires speed reductions in the range of 12:1 to 100:1.

To achieve different overall speed reductions from the input to the output member of the transmission, the second planet carrier may be eliminated. The new and novel invention disclosed herein is used in the same manner when the second planet carrier has been eliminated.

The materials of the preferred embodiment are alloy steel. The spindle and output carrier are made from alloy steel as are the gears, housing and washers.

The invention has been described in detail with particular emphasis on the preferred embodiments thereof, but it should be understood that variations and modifications within the spirit and scope of the invention may occur to those skilled in the art to which the invention pertains.

What is claimed is:

1. A transmission comprising: an input member, an output member, and a planetary gear train; said planetary gear train includes a stationary output carrier and a stationary spindle; said stationary output carrier includes a tapered outer surface and said stationary spindle includes a tapered inner surface; said tapered outer surface of said output carrier includes a variable outer diameter; said tapered inner surface of said spindle includes a variable inner diameter; said variable outer diameter of said tapered outer surface of said output carrier is larger than said variable inner diameter of said tapered inner surface of said spindle affixing said output carrier to said spindle; and, said planetary gear train effecting a speed reduction between said input member and said output member.

2. A transmission as claimed in claim 1 wherein said tapered outer surface of said output carrier further includes serrations.

3. A transmission as claimed in claim 1 wherein said tapered outer surface of said output carrier further includes adhesive.

4. A transmission comprising an input member, an output member and a planetary gear train; said planetary gear train includes a stationary output carrier and a stationary spindle; said output carrier includes an outer conically tapered surface; said spindle includes a tapered inner surface having a variable inner diameter; said outer conically tapered surface of said output carrier having a variable outer diameter; said output carrier immovably affixed to said stationary spindle by forcibly press-fitting said variable outer diameter of said outer conically tapered surface of said output carrier into immoveable engagement with said variable inner diameter of said tapered inner surface of said spindle; and, said planetary gear train effecting a speed reduction between said input member and said output member.

5. A transmission as claimed in claim 4 wherein said variable outer diameter of said output carrier is larger than said variable inner diameter of said spindle thereby providing an interference fit.

\* \* \* \* \*